April 11, 1961

G. BUNGAS 2,979,311

PORTABLE AIR CIRCULATING HEAT EXCHANGE UNIT

Filed June 24, 1958

INVENTOR
GEORGE BUNGAS
BY Almon S. Nelson
ATTORNEY

April 11, 1961 G. BUNGAS 2,979,311
PORTABLE AIR CIRCULATING HEAT EXCHANGE UNIT
Filed June 24, 1958 2 Sheets-Sheet 2

INVENTOR
GEORGE BUNGAS
BY
ATTORNEY

United States Patent Office 2,979,311
Patented Apr. 11, 1961

2,979,311

PORTABLE AIR CIRCULATING HEAT EXCHANGE UNIT

George Bungas, 417 Charles St., Pittsburgh 10, Pa.

Filed June 24, 1958, Ser. No. 744,126

5 Claims. (Cl. 257—303)

This invention relates to air conditioning and more particularly to a portable air circulating heat exchange unit which may be conveniently utilized in the home or elsewhere for heating or cooling.

Heretofore numerous types of portable heaters have been proposed and utilized, but in general, these have consisted of electric convection heaters, electrically heated coils over which air is circulated and electrically heated steam or water radiators. While these units have been relatively effective for the purpose intended, nevertheless, the majority of them present hot surfaces with which persons may accidentally come in contact and in the case of the electrically heated steam or water radiators, the same have been relatively heavy and cumbersome and also present the disadvantage of relatively hot exposed surfaces. Room air conditioners or coolers have also heretofore been combined with heating means but in general, these have been relatively complex and costly units and also were not particularly efficient heaters.

It is accordingly an object of the invention to provide a portable air circulating heat exchange unit which may be conveniently and economically manufactured from readily available materials and which may be conveniently utilized for room or space heating or cooling as the occasion demands.

A further object of the invention is the provision of a portable air circulating heat exchange unit in which a body of water is electrically heated and in which such heat is transferred to air flowing through coils immersed in the water, the unit being insulated to provide relatively cool exposed surfaces thereby minimizing the danger of burns to persons coming in contact therewith.

A still further object of the invention is the provision of a portable air circulating heat exchange unit utilizing an electrically heated body of water and in which the outer surfaces of the unit are insulated from the body of water by a layer of heat insulating material and also by a dead air space.

Another object of the invention is the provision of a portable air circulating heat exchange unit utilizing an electrically heated body of water and incorporating a pressure release valve to prevent an explosion in the event of an abnormal increase in pressure within the unit and also incorporating gauge means for externally indicating the level of water in the unit.

A further object of the invention is the provision of an air circulating heat exchange unit utilizing an electrically heated body of water having coils immersed therein and in which there is provided electrically driven blower means for circulating air through the coils and discharging the same into the space to be heated.

A still further object of the invention is the provision of a portable air circulating heat exchange unit utilizing a tank filled with water and insulated from the exterior wall of the unit and in which means is provided for heating the water and in which further means is provided for cooling the water when desired, there being coils immersed in the water through which air is circulated for heating or cooling of the same.

Another object of the invention is the provision of a portable air circulating heat exchange unit supported on castors or wheels to facilitate movement thereof and in which a relatively small tank of water is provided for varying the temperature of air flowing through coils immersed in the water.

A further object of the invention is the provision of a portable air circulating heat exchange unit utilizing a tank of water for varying the temperature of air flowing through coils immersed in the water and in which depressions are provided in the sidewalls of the tank to provide channels there being coils disposed in such channels and secured to the surface of the tank walls in order to transfer heat between water in the tank and a cooling or heating medium flowing through the coils.

Further objects and advantages of the invention will be apparent from the following description taken in conjunction with the accompanying drawing wherein.

Figure 1:
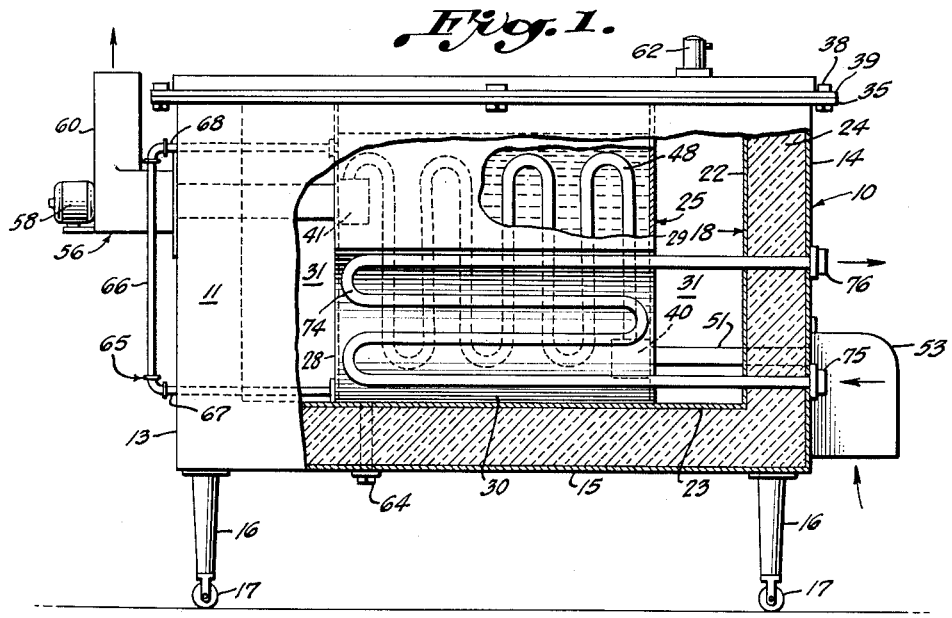
Fig. 1 is a side elevational view of a portable air circulating heat exchange unit constructed in accordance with this invention and with parts broken away and in section to show the internal construction thereof.
Figure 2:
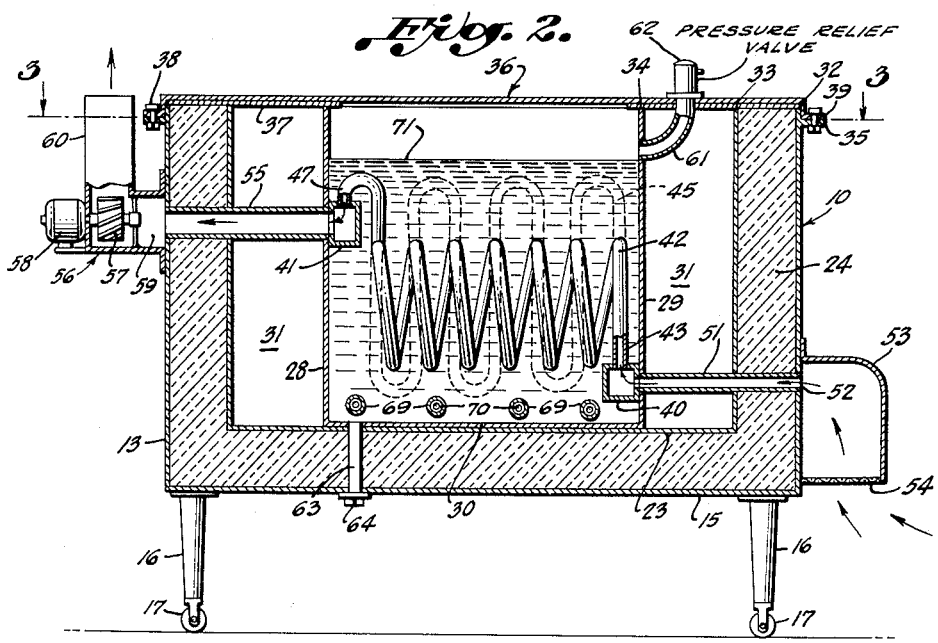
Fig. 2 is a sectional view taken substantially on the line 2—2 of Fig. 3.
Figure 3:
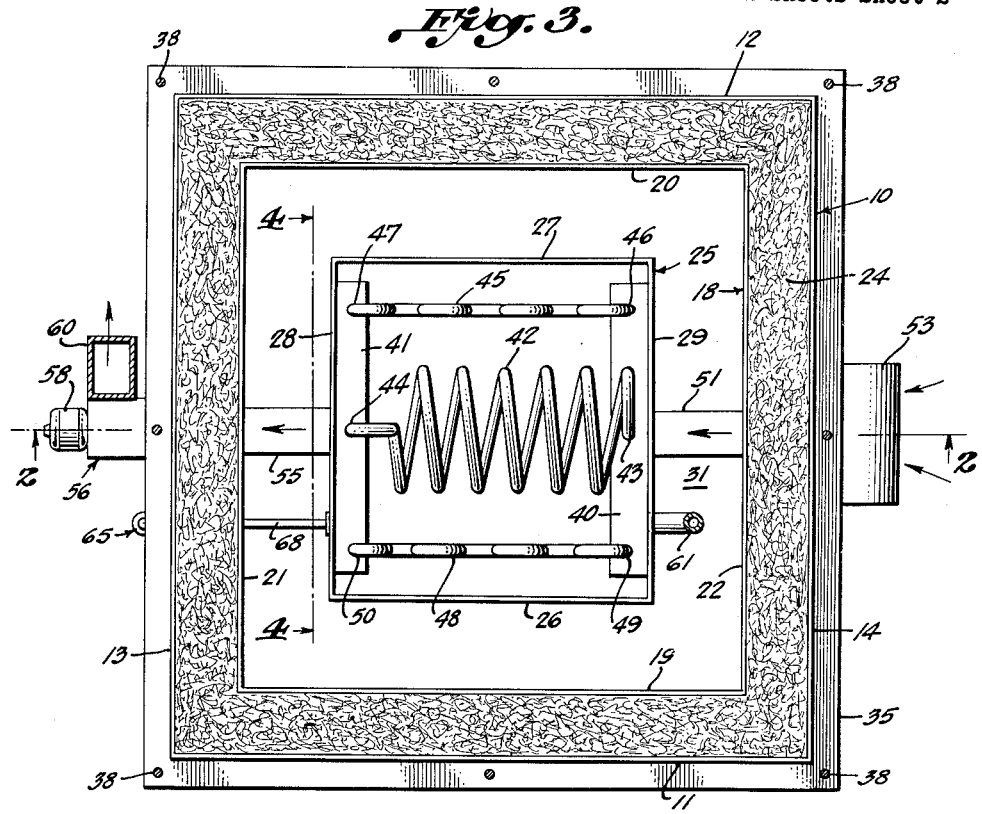
Fig. 3 is a sectional view taken substantially on the line 3—3 of Fig. 2.

With continued reference to the drawing, there is shown a portable circulating heat exchange unit constructed in accordance with this invention and which may well comprise a generally rectangular housing 10 open at the top and having sidewalls 11 and 12, end walls 13 and 14 and a bottom wall 15. The housing 10 may be supported on legs 16 which in turn are provided with castors or wheels 17 which facilitate movement of the unit.

A generally rectangular casing 18 open at the top and having sidewalls 19 and 20, end walls 21 and 22 and a bottom wall 23 is disposed interiorly of the housing 10 with the sidewalls 19 and 20, end walls 21 and 22 and the bottom wall 23 spaced inwardly from the sidewalls 11 and 12, end walls 13 and 14 and bottom wall 15 of the housing 10 to provide a space for receiving heat insulating material 24 which may take the form of fiberglass, rock wool or any other suitable heat insulating material.

A generally rectangular tank 25 open at the top and having sidewalls 26 and 27, end walls 28 and 29 and a bottom wall 30 is disposed interiorly of the casing 18 with the bottom wall 30 supported on the bottom wall 23 of the casing 18 and with the sidewalls 26 and 27 and end walls 28 and 29 of the tank 25 spaced inwardly from the sidewalls 19 and 20 and end walls 21 and 22 of the casing 18 to provide additional insulation in the form of a dead air space 31. The upper edge 32 of the housing 10 as well as the upper edge 33 of the casing 18 and the upper edge 34 of the tank 25 are disposed in substantially the same plane and the housing 10 is provided with an outwardly extending marginal flange 35 for a purpose to be presently described. A common cover plate 36 is provided with a gasket 37 engaging the upper edges 32, 33 and 34 of the housing 10, casing 18 and tank 25 respectively, and the cover plate 36 is secured in place for closing the entire top of the unit by screw threaded fasteners or the like 38 extending through a marginal flange 39 on the cover plate 36 and engaging the marginal flange 35 on the housing 10.

An air inlet manifold 40 is provided in one end of the tank 25 adjacent the bottom thereof, and an air outlet manifold 41 is provided in the opposite end of the tank 25 adjacent the top thereof. A spiral coil 42 is centrally disposed in the tank 25 and one end 43 of the coil 42 is connected to the inlet manifold 40 while the opposite end 44 of the coil 42 is connected to the air outlet manifold 41. A vertically disposed serpentine coil 45 is disposed in the tank 25 to one side of the spiral coil 42 and one end 46 of the coil 45 is connected to the manifold 40 and the opposite end 47 of the coil 45 is connected to the manifold 41. In a similar manner, a second serpentine coil 48 is disposed in the tank 25 in a vertical position at the opposite side of the spiral coil 42 and one end 49 of the coil 48 is connected to the manifold 40 while the opposite end 50 of the coil 48 is connected to the manifold 41. While one spiral coil 42 and two serpentine coils 45 and 48 are shown, it is to be understood that this is for illustrative purposes only and that any number of coils of any desired formation may be disposed in the tank 25 and connected between the air inlet manifold 40 and the air outlet manifold 41. The coils 42, 45 and 48, as well as the manifolds 40 and 41, the tank 25, the casing 18 and housing 10 may be formed of stainless steel, copper, brass or any other suitable material and, of course, the exterior surface of the housing 10 may be coated or decorated in any desired manner.

An air inlet conduit 51 is connected to the inlet manifold 40 and extends through the end wall 29 of the tank 25, the end wall 22 of the casing 18 and the end wall 14 of the housing 10. Secured to the end wall 14 of the housing 10 over the outer end 52 of the air inlet conduit 51 is a downwardly opening air intake hood 53 and a suitable filter screen 54 is provided in the open end of the hood 53.

An air outlet conduit 55 is connected to the air outlet manifold 41 and extends through the end wall 28 of the tank 25, the end wall 21 of the casing 19 and the end wall 13 of the housing 10. A blower 56 having a suitable rotor 57 driven by an electric motor 58 is secured to the end wall 13 of the housing 10 and the intake 59 of the blower 56 communicates with the air outlet conduit 55 and operation of the blower 56 serves to draw air through the filter screen 54, the hood 53, air inlet conduit 51, air inlet manifold 40, coils 42, 45 and 48, air outlet manifold 41 and air outlet conduit 55 and it is discharged to the atmosphere through a suitable blower outlet 60.

The filler pipe 61 is connected to the tank 25 and extends upwardly through the cover plate 36 and the filler pipe 61 is provided with a closure plug 62 incorporating a pressure release valve which serves to automatically relieve excess pressure in the tank 25. A drain pipe 63 is connected to the tank 25 at the bottom thereof for draining liquid therefrom and a closure plug 64 is provided on the drain pipe 63. In order to provide an external indication of the level of liquid in the tank 25, there is provided a liquid level gauge 65 having a gauge glass 66 with the bottom end thereof connected to the bottom portion of the tank 25 through a pipe 67 and with the upper end connected with the upper portion of the tank 25 through a pipe 68.

Spaced tubes 69 extend between the sidewalls 26 and 27 of the tank 25 adjacent the bottom thereof and electric heating means 70 are disposed in the tubes 69.

It will thus be seen that with the tank 25 filled with liquid, such as water to a level indicated by the line 71 which is above the coils 42, 45 and 48 and with the electric heating means 70 energized, the water in the tank 25 will be heated and will transfer such heat to air flowing through the coils 42, 45 and 48 as the result of operation of the blower 56. This, of course, will serve to heat such air and the same may be discharged to the room or space in which the heat exchange unit is located. Since the device is electrically operated, the same may be conveniently moved from place to place and merely connected with a convenient electrical outlet for operation thereof.

Figure 4:
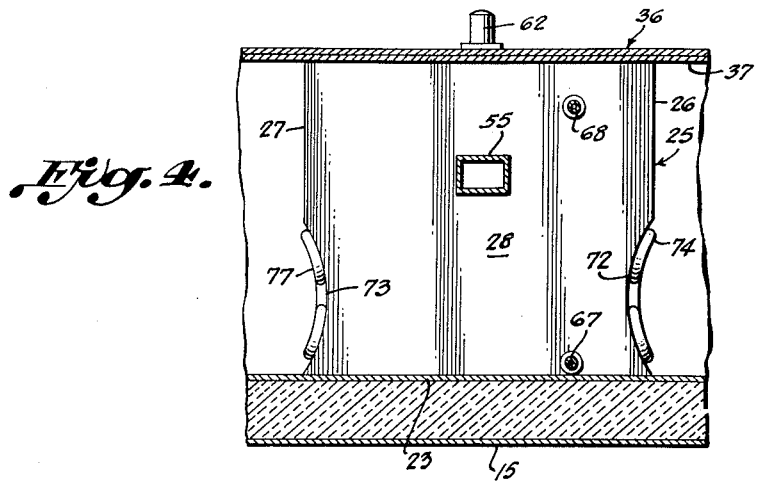
Fig. 4 is a fragmentary sectional view taken substantially on the line 4—4 of Fig. 3.

As best shown in Figs. 1 and 4, the sidewalls 26 and 27 of the tank 25 may be provided with elongated depressions adjacent the bottom thereof and extending between the end walls 28 and 29 in order to provide channels 72 and 73. Disposed in the channel 72 and secured to the wall thereof is a serpentine coil 74 provided with an inlet 75 and an outlet 76 exteriorly of the housing 10 for conducting a heating or cooling medium through the coil 74 in order to heat or cool the liquid in the tank 25. In a similar manner, a serpentine coil 77 is secured to the wall of the channel 73 and is likewise provided with an inlet and outlet for a heating or cooling medium to accomplish further heating or cooling of the liquid in the tank 25.

Normally the coils 74 and 77 will be utilized for conducting a cooling medium which in turn will cool the liquid in the tank 25 and thereby cool air flowing through the coils 42, 45 and 48 which will result in discharging cool air to the space surrounding the unit. The coils 74 and 77 may be connected to any suitable refrigeration apparatus or may be utilized to circulate cool air from an external source, but if desired, and in the event of failure of the electrical heating means 70, a heating medium may be circulated through the coils 74 and 77 to heat the liquid in the tank 25.

It is to be understood that the apparatus as described throughout the major portion of the description relates to the heating of air and that the arrows on the drawings indicate the passage of air which is being heated. In the event that the unit is used as an air cooling medium, then the motor 58 will be reversed and air will be drawn in through the duct 60 and pass outwardly through the hood 53 and filter 54.

It will thus be seen that by the above-described invention there has been provided a highly portable and convenient air circulating heat exchange unit which may be utilized for heating or cooling the space surrounding the same and which, at the same time, provides relatively cool external surfaces thereby minimizing the danger of burns to persons coming in contact with the unit. Furthermore, in view of the highly efficient heat insulation provided, the unit operates very efficiently, both as a heating unit and as a cooling unit.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A portable air circulating heat exchange unit freely movable from one location to another comprising a generally rectangular housing open at the top, a generally rectangular casing open at the top and disposed interiorly of said housing with the side, end and bottom walls of said casing spaced inwardly from the corresponding walls of said housing and with the space between said walls filled with heat insulating material, a generally rectangular tank open at the top disposed interiorly of said casing and supported on the bottom wall of said casing, the side and end walls of said tank being spaced inwardly from the side and end walls of said casing to provide a dead air heat insulating space, whereby said tank is doubly insulated to prevent injury from contact therewith, the upper edges of said housing, casing and tank being disposed in substantially the same plane, a common cover plate removably secured to said housing and having a gasket engaging the upper edges of said housing, casing and tank to close the same, an air inlet manifold mounted within and at one end of said tank adjacent the bottom thereof and extending transversely thereof, an air outlet manifold mounted within and at the opposite end of said tank adjacent the top thereof and extending transversely thereof, a spiral coil centrally disposed in said tank and connected between said manifolds, vertically disposed serpentine coils disposed in said tank on opposite sides of said spiral coil and connected between said manifolds, all of said coils extending longitudinally of said tank, an air inlet conduit connected to said inlet manifold and extending exteriorly of said housing, a downwardly opening air intake hood secured to said housing over said air intake conduit, a filter screen in said hood, an air outlet conduit connected to said outlet manifold and extending exteriorly of said housing, a blower for drawing air through said coils and discharging the same to the atmosphere, a filler pipe for said tank, a closure plug for said filler pipe and including a pressure release valve, a drain pipe for said tank, spaced tubes extending between the sidewalls of said tank adjacent the bottom and electrical heating means disposed in said tubes, whereby, with said tank filled with liquid, air flowing through said coils will be heated.

2. A portable air circulating heat exchange unit freely movable from one location to another, comprising a generally rectangular housing open at the top, a generally rectangular casing open at the top and disposed interiorly of said housing with the side, end and bottom walls of said casing spaced inwardly from the corresponding walls of said housing and with the space between said walls filled with heat insulating material, a generally rectangular tank open at the top and disposed interiorly of said casing and supported on the bottom wall of said casing, the side and end walls of said tank being spaced inwardly from the side and end walls of said casing to provide a dead air heat insulating space, whereby said tank is doubly insulated to prevent injury from contact therewith, a common cover plate removably secured to said housing, an air inlet manifold mounted within and at one end of said tank adjacent the bottom thereof, an air outlet manifold mounted within and at the opposite end of said tank adjacent the top thereof, a spiral coil centrally disposed in said tank and connected between said manifolds, vertically disposed serpentine coils disposed in said tank on opposite sides of said spiral coil and connected between said manifold, an air inlet conduit connected to said inlet manifold and extending exteriorly of said housing, a downwardly opening air intake hood secured to said housing over said inlet conduit, a filter screen in said hood, an air outlet conduit connected to said outlet manifold and extending exteriorly of said housing, a blower for drawing air through said coils and discharging the same to the atmoshere, a filler pipe for said tank, a closure plug for said filler pipe and including a pressure relief valve, a drain pipe for said tank, spaced tubes extending between the sidewalls of said tank adjacent the bottom and electric heating means disposed in said tubes, whereby, with said tank filled with liquid, air flowing through said coils will be heated.

3. A portable air circulating heat exchange unit freely movable from one location to another, comprising a generally rectangular housing open at the top, a generally rectangular casing open at the top and disposed interiorly of said housing with the side, end and bottom walls of said casing spaced inwardly from the corresponding walls of said housing and with the space between said walls filled with insulating material, a generally rectangular tank open at the top and disposed interiorly of said casing and supported on the bottom wall of said casing, the side and end walls of said tank being spaced inwardly from the side and end walls of said casing to provide a dead air heat insulating space, whereby said tank is doubly insulated to prevent injury from contact therewith, a common cover plate removavly secured to said housing, an air inlet manifold mounted within and at one end of said tank, an air outlet manifold mounted within and at the opposite end of said tank, a spiral coil centrally disposed in said tank and connected between said manifolds, vertically disposed serpentine coils disposed in said tank on opposite sides of said spiral coil and connected between said manifolds, an air inlet conduit connected to said inlet manifold and extending exteriorly of said housing, a downwardly opening air intake hood secured to said housing over said inlet conduit, a filter screen in said hood, an air outlet conduit connected to said outlet manifold and extending exteriorly of said housing, a blower for drawing air through said coils and discharging the same to the atmosphere, a filler pipe for said tank, a closure plug for said filler pipe and including a pressure relief valve, a drain pipe for said tank, and means for varying the temperature of liquid in said tank, whereby the temperature of air flowing through said coils will be varied.

4. A portable air circulating heat exchange unit freely movable from one location to another, comprising a generally rectangular housing open at the top, a generally rectangular casing open at the top and disposed interiorly of said housing with the side, end and bottom walls of said casing spaced inwardly from the corresponding walls of said housing and with the space between said walls filled with heat insulating material, a generally rectangular tank open at the top and disposed interiorly of said casing and supported on the bottom wall of said casing, the side and end walls of said tank being spaced inwardly from the side and end walls of said casing to provide a dead air heat insulating space, whereby said tank is doubly insulated to prevent injury from contact therewith, a common cover plate removably secured to said housing, an air inlet manifold at one end of said tank, an air outlet manifold at the opposite end of said tank, a plurality of coils disposed in said tank and connected between said manifolds, an inlet conduit connected to said inlet manifold and extending exteriorly of said housing, an air outlet conduit connected to said outlet manifold and extending exteriorly of said housing, a blower connected to one of said conduits for forcing air through said coils and discharging the same to the atmosphere and means for varying the temperature of liquid in said tank, whereby the temperature of air flowing through said coils will be varied.

5. A portable air circulating heat exchange unit freely movable from one location to another, comprising a generally rectangular housing open at the top, a generally rectangular casing open at the top and disposed interiorly of said housing with the side, end and bottom walls of said casing spaced inwardly from the corresponding walls of said housing and with the space between said walls filled with heat insulating material, a generally rectangular tank open at the top and disposed interiorly of said casing and supported on the bottom wall of said casing, the side and end walls of said tank being spaced inwardly from the side and end walls of said casing to provide a dead air heat insulating space, whereby said tank is doubly insulated to prevent injury from contact therewith, a common cover plate removably secured to said housing, an air inlet manifold at one end of said tank, an air outlet manifold at the opposite end of said tank, a plurality of coils disposed in said tank and connected between said manifolds, an air inlet conduit connected to said inlet manifold and extending exteriorly of said housing, an air outlet conduit connected to said outlet manifold and extending exteriorly of said housing, a blower connected to one of said conduits for forcing air through said coils and discharging the same to the atmosphere, depressions in the opposite side walls of said tank extending between the end walls thereof to provide channels, cooling coils disposed in said channels and secured to said side walls and inlet and outlet connections extending exteriorly of said housing for conducting a cooling medium to and from said cooling coils, whereby, with said tank filled with liquid, air flowing through the coils in said tank will be cooled.

References Cited in the file of this patent

UNITED STATES PATENTS

| | | |
|---|---|---|
| 1,704,535 | Grafflin | Mar. 5, 1929 |
| 1,747,070 | Grafflin | Feb. 11, 1930 |
| 1,875,752 | Montero | Sept. 6, 1932 |
| 2,249,051 | Schulse | July 15, 1941 |
| 2,819,044 | Bungas | Jan. 7, 1958 |